G. W. Lampson,
Water Filter,
No. 62,757.   Patented Mar. 12, 1867.
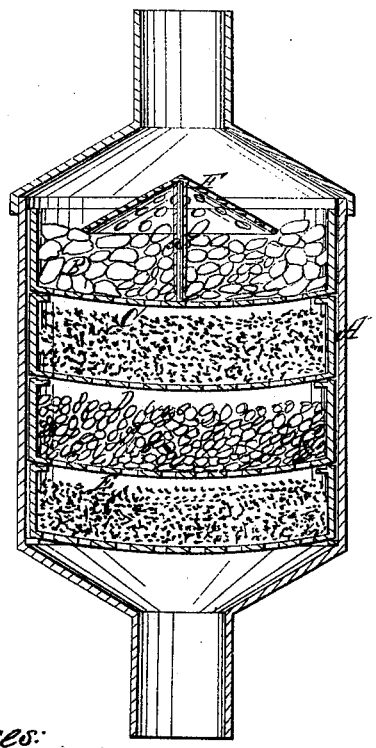
Witnesses:
Theo Tusch
J. A. Service
Inventor:
Geo. H. Lampson
Per Munn & Co
Attorneys

United States Patent Office.

GEORGE W. LAMPSON, OF WATERLOO, NEW YORK.

Letters Patent No. 62,757, dated March 12, 1867.

IMPROVEMENT IN CISTERN FILTERS.

*The Schedule referred to in these Letters Patent and making part of the same.*

TO ALL WHOM IT MAY CONCERN:

Be it known that I, GEORGE W. LAMPSON, of Waterloo, in the county of Seneca, and State of New York, have invented a new and improved Cistern Filter; and I do hereby declare that the following is a full, clear, and exact description of the same.

The object of my invention is to construct a rain-water filter, and adapt it to the conductor pipe so that the rain water shall be purified or cleansed before it enters the cistern. And the invention consists in constructing a vessel, and placing in it pans containing alternate layers of gravel, sand, and charcoal, or other substances, into which the water shall be discharged from the conductor pipe, and from which it may be discharged into the cistern.

And to enable others skilled in the art to make and use my invention, I will proceed to describe its construction and operation, reference being had to the accompanying drawing, which forms a part of this specification, and to the letters of reference marked thereon.

The drawing represents a vertical section of my filter.

A is the vessel or outside casing, formed at both ends so as to be attached to conductor pipes. B C D and E are pans or vessels containing gravel and charcoal, or gravel, charcoal, and sand, as may be desired. Other clearing substances may be used in lieu of, or in connection with, the above. But it is well known that charcoal is one of the most valuable purifying and disinfecting substances with which we are acquainted, or which have been discovered, and, therefore, I consider it important to use charcoal in all filters for the purification of water. There may be more or less of these layers or pans, as may be deemed best. Attached to the uppermost vessel B is a cone, whose apex is directly under the centre of the pipe which discharges the water into the filter. This cone is perforated; but the principal object of it is to scatter and direct the water toward the outside of the vessel B and the other vessels or pans. This arrangement facilitates the operation. This cone is represented by F, in the drawing. The bottoms of these pans are slightly concave, and are perforated, to allow the water to drop from one pan to the other, and so on to the bottom. They are constructed so that they stand one upon the other, as seen in the drawing, which arrangement allows them to be easily removed whenever it is necessary to cleanse the filter. Upon the centre of the bottom of the upper pan B a stiff rod is attached, which rod stands in an upright position. On the under side of the cone F, attached beneath the apex, is a tube, $a$, which slips over the rod, and in this manner the cone is held in position. The upper portion of the vessel A is removable, for purposes of cleansing, &c.

Having thus described my invention, what I claim as new, and desire to secure by Letters Patent, is—

The pans B C D and E and cone F, in combination with the vessel A, the whole constructed and arranged substantially as and for the purpose described.

GEORGE W. LAMPSON.

Witnesses:
   PLATT CROSBY,
   WILLIAM FURNISS.